United States Patent
Kim et al.

(10) Patent No.: US 9,554,263 B2
(45) Date of Patent: Jan. 24, 2017

(54) METHOD AND DEVICE FOR DISCOVERING NEIGHBORS FOR WIRELESS FIDELITY DIRECT (WFD) PEER TO PEER (P2P) COMMUNICATION

(75) Inventors: Bonghoe Kim, Anyang-si (KR); Suhwook Kim, Anyang-si (KR); Yunjung Yi, Anyang-si (KR); Jaewon Lim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 67 days.

(21) Appl. No.: 14/241,299

(22) PCT Filed: Aug. 27, 2012

(86) PCT No.: PCT/KR2012/006820
§ 371 (c)(1),
(2), (4) Date: Feb. 26, 2014

(87) PCT Pub. No.: WO2013/035999
PCT Pub. Date: Mar. 14, 2013

(65) Prior Publication Data
US 2014/0206407 A1    Jul. 24, 2014

Related U.S. Application Data

(60) Provisional application No. 61/527,618, filed on Aug. 26, 2011.

(51) Int. Cl.
*H04W 8/00* (2009.01)
(52) U.S. Cl.
CPC .................. *H04W 8/005* (2013.01)

(58) Field of Classification Search
CPC ..... H04W 8/005; H04W 76/023; H04W 84/18
See application file for complete search history.

(56) References Cited

U.S. PATENT DOCUMENTS

| | | | |
|---|---|---|---|
| 2011/0161697 A1* | 6/2011 | Qi et al. | 713/320 |
| 2011/0276633 A1* | 11/2011 | Marchisio | H04L 67/1095 709/205 |
| 2015/0063095 A1* | 3/2015 | Deng et al. | 370/221 |

FOREIGN PATENT DOCUMENTS

| KR | 10-2008-0081679 | 9/2008 |
|---|---|---|
| KR | 10-2010-0020925 | 2/2010 |

OTHER PUBLICATIONS

PCT International Application No. PCT/KR2012/006820, Written Opinion of the International Searching Authority dated Jan. 28, 2013, 15 pages.

* cited by examiner

*Primary Examiner* — Fanghwa Wang
(74) *Attorney, Agent, or Firm* — Lee Hong Degerman Kang Waimey

(57) ABSTRACT

A method and device for performing the process of discovering neighbors for Wi-Fi P2P communication. The method includes: checking at a first WFD P2P device whether there is WFD P2P group in which participation is possible; performing, at the first WFD P2P device, the operation for participating in the WFD P2P group in which participation is possible, if there is a WFD P2P group in which participation is possible, or performing, at the first WFD P2P device, the operation for creating a new WFD P2P group or entering a sleep mode, if there is no WFD P2P group in which participation is possible.

8 Claims, 10 Drawing Sheets

METHOD AND DEVICE FOR DISCOVERING NEIGHBORS FOR WIRELESS FIDELITY DIRECT (WFD) PEER TO PEER (P2P) COMMUNICATION

CROSS-REFERENCE TO RELATED APPLICATIONS

This application is the National Stage filing under 35 U.S.C. 371 of International Application No. PCT/KR2012/006820, filed on Aug. 27, 2012, which claims the benefit of U.S. Provisional Application No. 61/527,618, filed on Aug. 26, 2011, the contents of which are hereby incorporated by reference herein in their entirety.

TECHNICAL FIELD

The present invention relates to a method and apparatus for performing Wireless Fidelity Direct (WFD) Peer to Peer (P2P) communication in a wireless communication system, and more particularly to a method and apparatus for discovering a neighbor for WFD P2P communication.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

Standards for Wireless Local Area Network (WLAN) technology have been developed as Institute of Electrical and Electronics Engineers (IEEE) 802.11 specifications. IEEE 802.11b may provide a maximum transfer rate of 11 Mbps, and IEEE 802.11a may provide a maximum transfer rate of 54 Mbps. IEEE 802.11g may use Orthogonal Frequency Division Multiplexing (OFDM) at 2.4 GHz, and provide a transfer rate of 54 Mbps. IEEE 802.11n may use Multiple Input Multiple Output (MIMO)-OFDM, and provide a transfer rate of 300 Mbps to four spatial streams. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transfer rate of 300 Mbps. IEEE 802.11n may support a channel bandwidth up to 40 MHz to provide a transfer rate of 600 Mbps. IEEE 802.11p is a standard for supporting Wireless Access in Vehicular Environment (WAVE). For example, IEEE 802.11p provides improvement matters needed for supporting Intelligent Transportation Systems (ITS). IEEE 802.11ai is a standard for supporting fast initial link setup of an IEEE 802.11 station (STA).

DISCLOSURE

Technical Problem

An object of the present invention is to provide a method and apparatus for efficiently performing WFD P2P communication. Another object of the present invention is to provide a method and apparatus for efficiently discovering neighbors for WFD P2P communication.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In an aspect of the present invention, a method for performing a neighbor discovery procedure for wireless fidelity direct (WFD) peer to peer (P2P) communication is provided, in which the method comprises: determining, by a first WFD P2P device, if a participatable WFD P2P group exists or not; if the participatable WFD P2P group exists, allowing performing, by the first WFD P2P device, an operation for participating in the participatable WFD P2P group; and if the participatable WFD P2P group does not exist, performing, by the first WFD P2P device, an operation for generating a new WFD P2P group or entering a sleep mode, wherein the operation for participating in the participatable WFD P2P group includes: receiving neighbor list information about second WFD P2P device(s) in the WFD P2P group from a specific WFD P2P device managing the WFD P2P group; and periodically transmitting neighbor advertisement information about the first WFD P2P device to the specific WFD P2P device after reception of the neighbor list information.

In another aspect of the present invention, a first wireless fidelity direct peer to peer (WFD P2P) device configured to perform a neighbor discovery procedure for WFD P2P communication is provided, in which the first WFD P2P device comprises: a radio frequency (RF) unit; and a processor, wherein the processor determines if a participatable WFD P2P group exists or not, if the participatable WFD P2P group exists, performs an operation for participating in the participatable WFD P2P group, and if the participatable WFD P2P group does not exist, and perform an operation for generating a new WFD P2P group or entering a sleep mode, wherein the operation for participating in the participatable WFD P2P group includes: receiving neighbor list information about second WFD P2P device(s) in the WFD P2P group from a specific WFD P2P device managing the WFD P2P group; and periodically transmitting neighbor advertisement information about the first WFD P2P device to the specific WFD P2P device after reception of the neighbor list information.

A transmission period of the neighbor advertisement information may be adaptively configured in consideration of at least one of (1) mobility of the first WFD P2P device, (2) power level of the first WFD P2P device, (3) a level of service provision intent of the first WFD P2P device scheduled to receive or provide a service, and (4) the number of services to be received by the first P2P device.

The neighbor list information may include at least one of WFD P2P device ID information, mobility associated information, power information, WFD P2P device associated information, and information for pre-association with a WFD P2P device.

The generation of the new WFD P2P group may include: broadcasting neighbor list information having information regarding the fist WFD P2P device; receiving neighbor advertisement information about the corresponding WFD P2P device from third WFD P2P device(s) broadcasting the neighbor list information; and updating the neighbor list information using the neighbor advertisement information.

If neighbor advertisement information is not received from at least one WFD P2P device of the third WFD P2P device(s) for a predetermined time or more, information about the at least one WFD P2P device may be removed from the neighbor list information.

Advantageous Effects

As is apparent from the above description, the embodiments of the present invention can efficiently perform WFD P2P communication in a wireless communication system. In more detail, the embodiments can efficiently discover a neighbor for WFD P2P communication.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), OFDM (Orthogonal Frequency Division Multiplexing), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as IEEE 802.16 (WiMAX), IEEE 802-20, and E-UTRA (Evolved UTRA). OFDM may be implemented through wireless (or radio) technology such as IEEE 802.11.

For clarity, the following description focuses on IEEE 802.11 (Wi-Fi). However, technical features of the present invention are not limited thereto. For example, exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

It should be noted that specific terms disclosed in the present invention are proposed for convenience of description and better understanding of the present invention, and the use of these specific terms may be changed to other formats within the technical scope or spirit of the present invention. In some instances, well-known structures and devices are omitted in order to avoid obscuring the concepts of the present invention and the important functions of the structures and devices are shown in block diagram form. The same reference numbers will be used throughout the drawings to refer to the same or like parts. The order of operations to be disclosed in the embodiments of the present invention may be changed. Some components or characteristics of any embodiment may also be included in other embodiments, or may be replaced with those of the other embodiments as necessary.

Figure 1A:
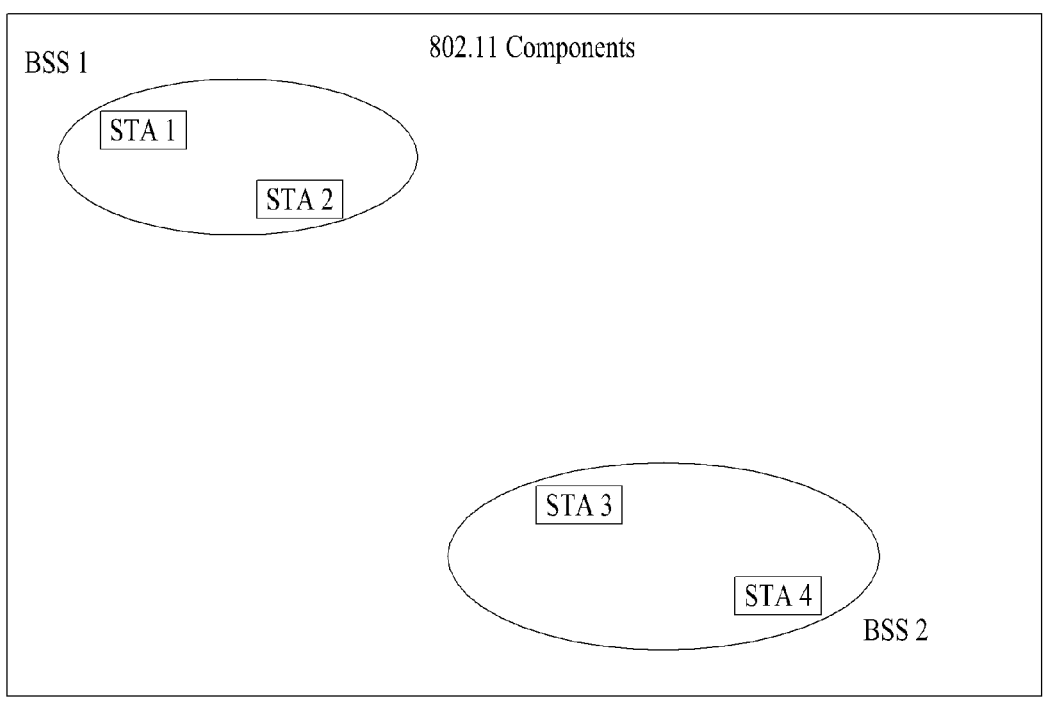
FIG. 1a exemplarily shows an IEEE 802.11 system according to one embodiment of the present invention.

FIG. 1a exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1a, two BSSs (BSS1 and BSS2) are shown and two STAs are included in each of the BSSs (i.e. STA1 and STA2 are included in BSS1 and STA3 and STA4 are included in BSS2). In this case, STA may operate according to MAC (Medium Access Control)/PHY (Physical) rules. STA may include an Access Point (AP) STA (hereinafter referred to as "AP") and a non-AP STA. AP may provide network (e.g., WLAN) connection to a non-AP STA through a radio interface. AP may be implemented as a fixed type or a mobile type, and may include mobile wireless devices (e.g., a laptop computer, a smartphone, etc.) for providing a hot spot. The AP may correspond to a base station (BS), a Node-B, an evolved Node-B (eNB), a base transceiver system (BTS), a femto BS, etc. The non-AP STA may correspond to a handheld device, for example, a laptop computer, a PDA, a wireless modem, a smartphone, etc. In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS).

An ellipse indicating the BSS in FIG. 1a may be understood as a coverage area in which STAs included in the corresponding BSS maintain communication. This area may be referred to as a Basic Service Area (BSA). In the IEEE 802.11 LAN, the most basic type of BSS is an Independent BSS (IBSS). For example, the IBSS may have a minimum form consisting of only two STAs. The BSS (BSS1 or BSS2)

of FIG. 1a, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS.

Figure 1B:
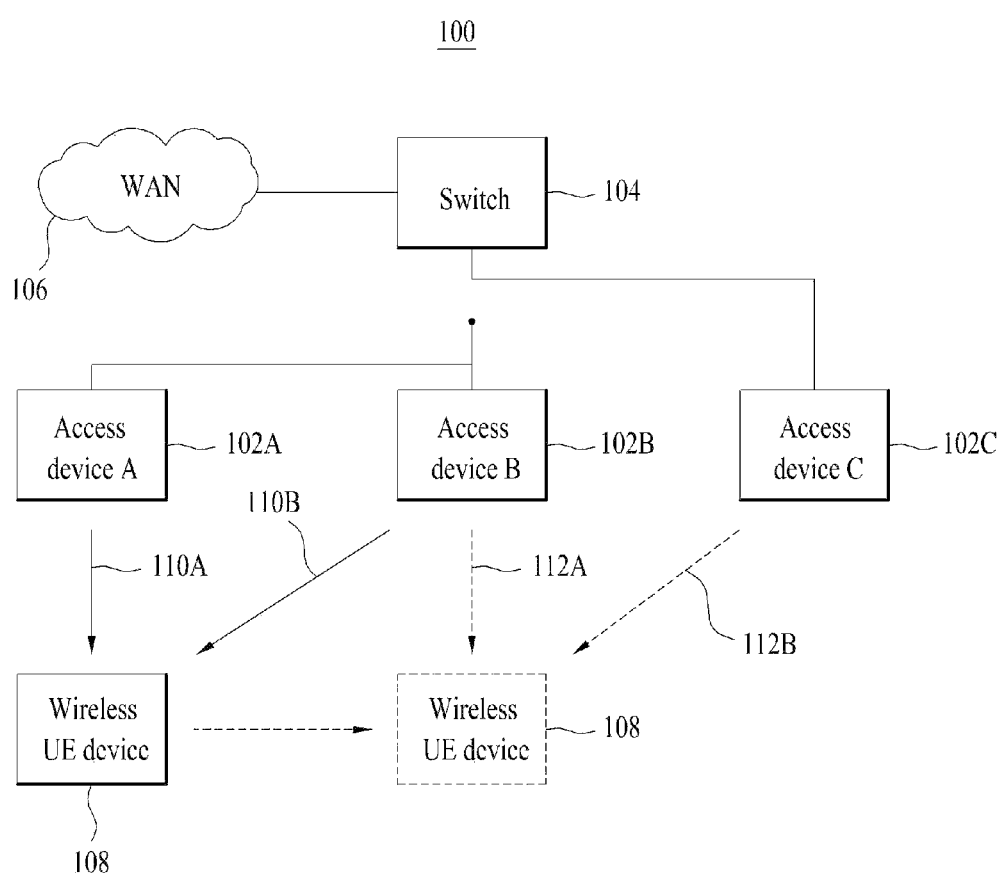
FIG. 1b is a block diagram illustrating a communication system including access devices and wireless UE devices.

FIG. 1b is a block diagram illustrating a communication system 100 including access devices (e.g., AP STAs) (102A, 102B, 102C) and wireless UE devices (e.g., non-AP STAs).

Referring to FIG. 1b, the access devices (102A to 102C) are connected to a switch 104 for providing connection to a Wide Area Network (WAN) 106 such as Internet. The access devices (102A to 102C) may provide wireless connection to wireless communication devices contained in a coverage area (not shown) of the access devices through a time division multiplexing (TDM) network. Therefore, the access devices (102A to 102C) may commonly provide the whole WLAN coverage region of the system 100. For example, a wireless device 108 may be present in a coverage region of the access devices (102A, 102B), as represented by a box denoted by a solid line. Therefore, the wireless device 108 may receive beacons from respective access devices (102A, 102B) as denoted by solid-lined arrow marks (110A, 110B). If the wireless device 108 roams from a solid-lined box to a dotted-lined box, the wireless device 108 enters a coverage region of the access device 102C, and moves out of a coverage region of the access device 102A. Accordingly, the wireless device 108 may receive beacons from the access devices (102B, 102C) as denoted by dotted-lined arrow marks (112A, 112B).

When the wireless device 108 roams in the whole WLAN coverage region provided from the system 100, the wireless device 108 may determine which access device provides the best connection to the current wireless device 108. For example, the wireless device 108 may repeatedly scan beacons of neighbor access devices, and may measure signal strength (e.g., power) associated with each beacon. Accordingly, the wireless device 109 may be connected to an access device for providing optimum network connection on the basis of maximum beacon signal strength. The wireless device 108 may use other references associated with optimum connection. For example, the optimum connection may be associated with many more preferable services (e.g., content, data rate, and the like).

Figure 2:
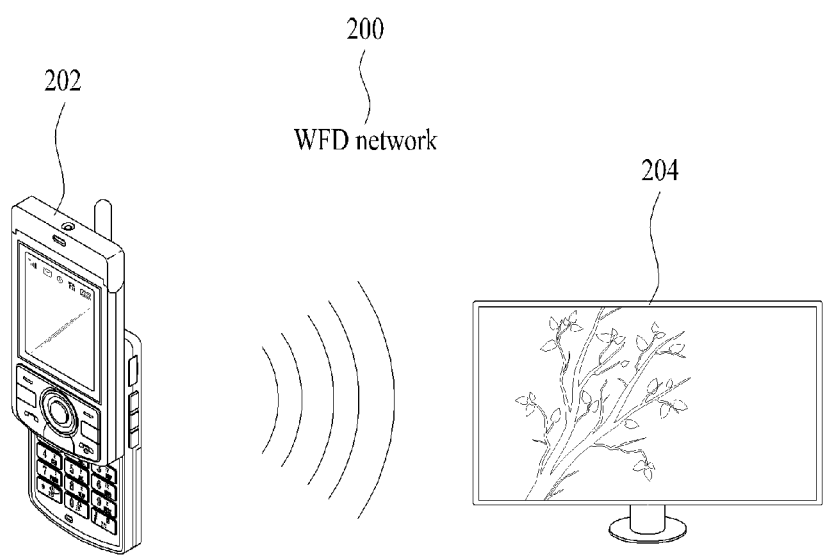
FIG. 2 is a conceptual diagram illustrating a Wi-Fi Direct (WFD) network.

FIG. 2 is a conceptual diagram illustrating a Wi-Fi Direct (WFD) network. The WFD network can enable the Wi-Fi devices not to participate in a home network, an office network, a hot-spot network, and performs Device to Device (D2D) (or Peer to Peer: P2P) communication, and has been proposed by Wi-Fi Alliance. Hereinafter, WFD based communication is referred to as WFDD2D communication (simply, D2D communication) or WFDP2P communication (simply, P2P communication). In addition, the WFDP2P execution device will hereinafter be referred to as a WFDP2P device (simply a P2P device).

Referring to FIG. 2, the WFD network 200 may include at least one Wi-Fi device configured to include a first WFD device 202 and a second WFD device 204. The WFD device may include Wi-Fi supporting devices, for example, a display device, a printer, a digital camera, a projector, a smartphone, etc. In addition, the WFD device may include a non-AP STA and an APSTA. In this example, the first WFD device 202 is a smartphone, and a second WFD device 204 display device. The WFD devices of the WFD network may be directly interconnected. In more detail, P2P communication may indicate that a signal transmission path between two WFD devices is directly configured in the corresponding WFD devices without passing through a third device (e.g., AP) or a legacy network (e.g., a network coupled to WLAN through an AP). In this case, a signal transmission path directly configured between two WFD devices may be limited to a data transmission path. For example, P2P communication may indicate that a plurality of non-STAs transmits data (e.g., voice, image, text information, etc.) without passing through the AP. A signal transmission path for control information (e.g., resource allocation information for P2P configuration, wireless device ID information, etc.) may be directly configured between WFD devices (e.g., non-AP STA to non-AP STA, non-AP STA to AP), may be configured between two WFD devices (e.g., non-AP to non-AP STA) via the AP, or may be configured between the AP and the corresponding WFD device (e.g., AP to non-AP STA #1, AP to non-AP STA #2).

Figure 3:
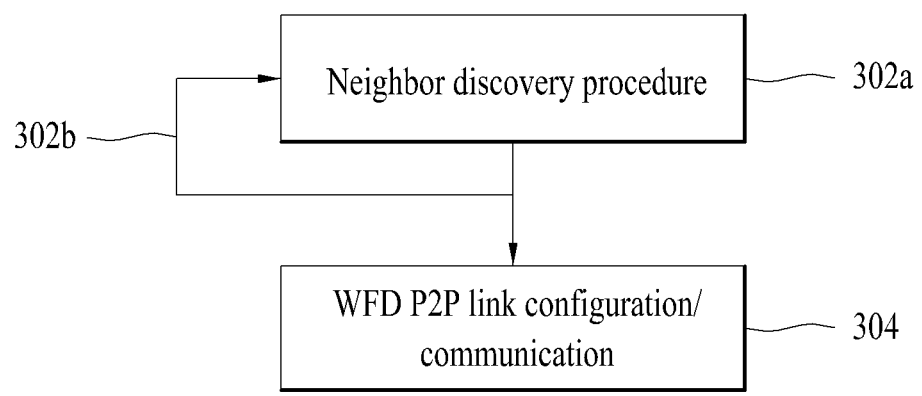
FIG. 3 is a flowchart illustrating a method for constructing a WFD network.

FIG. 3 is a flowchart illustrating a method for constructing a WFD network.

Referring to FIG. 3, the WFD network construction process may be largely classified into two processes. A first process is a neighbor discovery (ND) procedure in step S302a. A second process is a P2P link configuration and communication process in step S304. Through the neighbor discovery process, the WFD device (e.g., 202 of FIG. 2) searches for another neighbor WFD device (e.g., 204 of FIG. 2) contained in (its own radio) coverage, and may obtain information of association (e.g., pre-association) with the corresponding WFD device. In this case, the pre-association may indicate a second layer pre-association in a radio protocol. For example, information needed for the pre-association may include ID information of the neighbor WFD device. The neighbor discovery process may be carried out per available radio channel in step S302b. Thereafter, the WFD device 202 may perform WFDP2P link configuration/communication with another WFD device 204. For example, after the WFD device 202 is connected to a peripheral WFD device 204, it is determined whether the corresponding WFD device 204 is a WFD device incapable of satisfying service requirements of a user. For this purpose, after the WFD device 202 is connected to the peripheral WFD device 204 and the second layer pre-association, the WFD device 202 can explore the corresponding WFD device 204. If the corresponding WFD device 204 does not satisfy service requirements of the user, the WFD device 202 may sever association of the second layer configured in the corresponding WFD device 204, and may configure the second layer association with another WFD device. In contrast, if the corresponding WFD device 204 satisfies the user service requirements, two WFD devices (202, 204) can transmit and receive signals through the P2P link.

Figure 4:
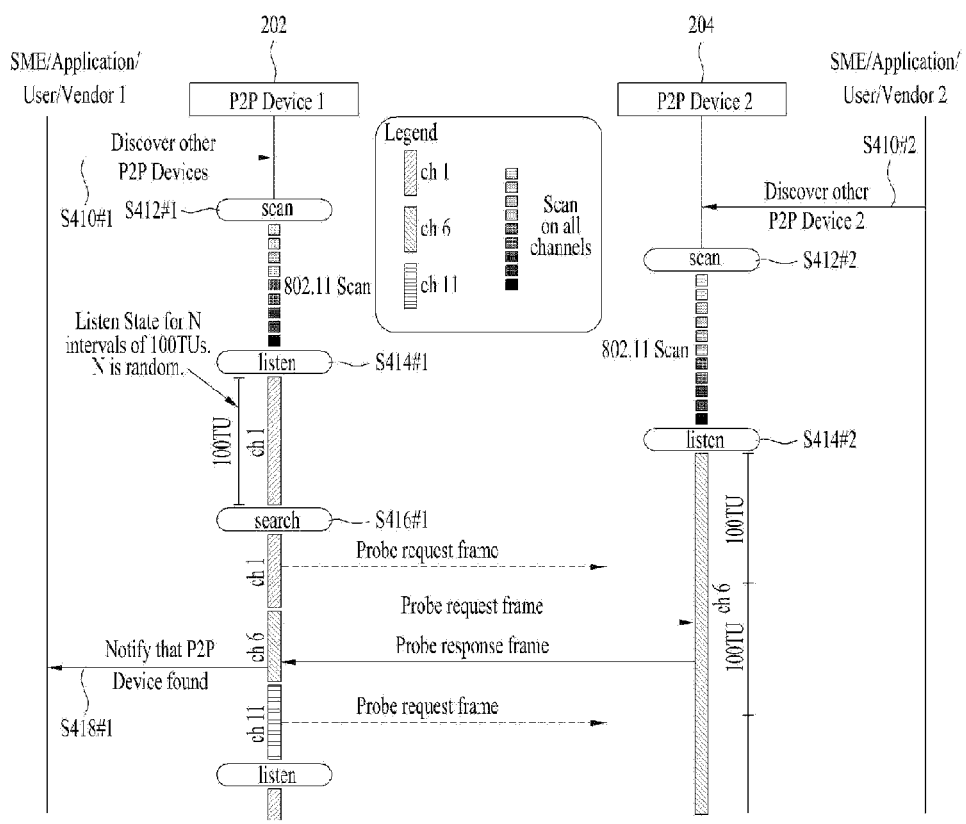
FIG. 4 is a conceptual diagram illustrating a neighbor discovery process.

The neighbor discovery process is shown in FIG. 4. FIG. 4 exemplarily shows the operations between one WFD device 202 and the other WFD device 204 shown in FIG. 3.

Referring to FIG. 4, the neighbor discovery process of FIG. 3 may be initiated by indication of station management entity (SME)/application/user/vendor in step S410. The scanning step S412 may include the operation for scanning all available RF channels according to 802.11 schemes. Through the above-mentioned operation, the P2P device can confirm the best operation channel. The search steps (S414~S416) may include a listening mode S414 and a searching mode S416. The P2P device may alternately repeat the listening mode S414 and the searching mode S416. The P2P devices (202, 204) may perform active searching using a probe request frame in the searching mode S416. For rapid searching, the searching range may be limited to social channels denoted by Channels #1, #6, #11 (2412, 2437, 2462 MHz). In addition, the P2P devices (202, 204) may select only one channel from among three social channels in the listening mode S414, and maintain a reception status. In this case, if the other P2P device (e.g., 202) receives the probe request frame in the searching mode, the P2P device (e.g., 204) generates a probe response frame in response to the received probe request frame. A time of the listening mode S414 may be given at random (e.g., 100, 200, 300 time unit (TU)). The P2P device continuously repeats the search mode and the reception mode so that it reaches a common channel. After the P2P device discovers another P2P device, the P2P device may discover/exchange a device type, a manufacturer, or a familiar device name by using the probe request frame and the probe response frame such that the P2P device can be selectively coupled to the corresponding P2P device. If the P2P device discovers the peripheral P2P device and obtains necessary information through the neighbor discovery process, the P2P device (e.g., 202) may inform SME/application/UE/vendor of the P2P device discovery in step S418.

Presently, P2P may be mainly used for semi-static communication such as remote printing, photo sharing, etc. However, due to generalization of Wi-Fi devices and location based services, P2P availability is gradually increased. For example, wireless devices registered in social chatting (e.g., Social Network Service (SNS)) can recognize radio devices located in a neighboring region on the basis of the location based service, and can transmit and receive information in the neighboring region on the basis of the location based service. It is expected that the P2P device will be actively used in location-based advertisement provision, location-based news broadcasting, and game interaction between wireless devices. For convenience of description, such P2P application will hereinafter be referred to as new P2P application.

Figure 5:
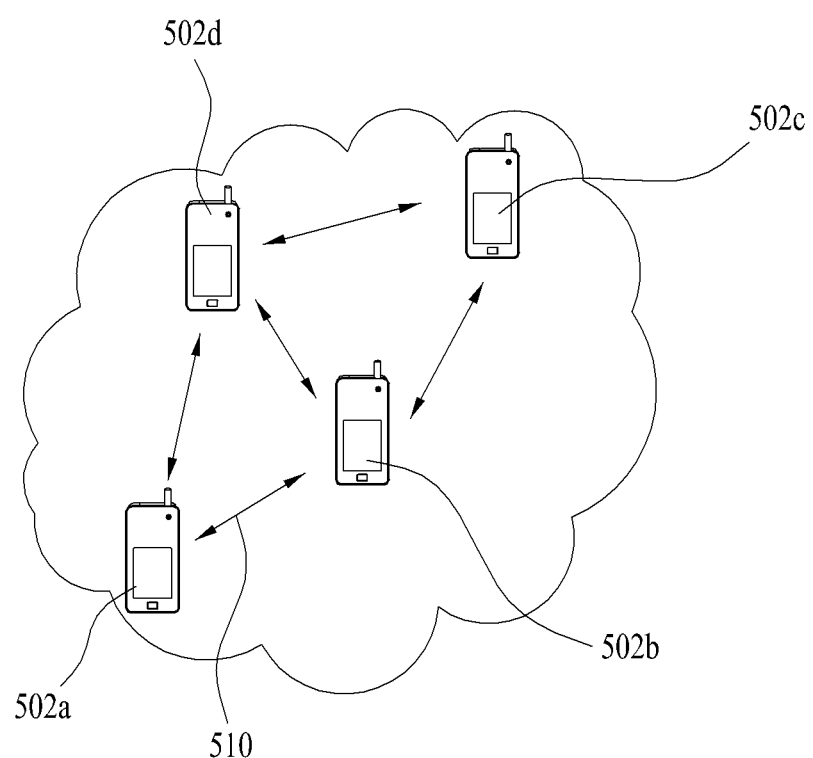
FIG. 5 shows an exemplary WFD network.

FIG. 5 shows the WFD network aspects for use in the case in which new P2P application (e.g., social chatting, location-based service provision, game interaction, etc.) is applied. Referring to FIG. 5, a plurality of P2P devices (502a to 502d) performs P2P communication 510 in the WFD network, P2P device(s) constructing the WFD network may be changed at any time due to movement of the P2P device(s), and a new WFD network may be dynamically generated or deleted within a short time. As described above, characteristics of the new P2P application indicate that P2P communication can be dynamically performed and terminated within a short time among a plurality of P2P devices in the dense network environment.

However, since the legacy P2P mechanism does not consider dynamic P2P communication among a plurality of P2P devices, it is impossible for the legacy P2P mechanism to efficiently cope with the new P2P application. For example, the legacy WFD neighbor discovery process shown in FIGS. 3 to 4 is inappropriate for new P2P application. As shown in FIG. 4, the neighbor discovery process may include the searching mode and the listening mode and be independently configured in each P2P device, and this information is not shared among the P2P devices. Accordingly, for P2P communication, the P2P devices repeat the searching mode/the listening mode using the on-demand/blind scheme, and may reach a mutual common channel. The neighbor discovery process using the blind scheme can reduce unnecessary signaling overhead in the case in which there is a small number of P2P devices participating in the WFD network, resulting in increased resource efficiency. However, if the number of P2P devices participating in the WFD network is increased up to a predetermined number, the following problems may occur. In more detail, according to the legacy scheme, (1) a long-time latency until neighbor discovery is completed, (2) inefficiency (high overhead) of neighbor discovery in the dense network, and (3) high communication overhead for connection (or association) configuration.

In order to solve the above-mentioned problems, the present invention provides a method for dynamically permitting the neighbor discovery process. For convenience of description, the above-mentioned scheme of the present invention is referred to as an automatic neighbor discovery scheme. The legacy scheme of FIG. 4 is referred to as the On-Demand neighbor discovery scheme.

Figure 6:
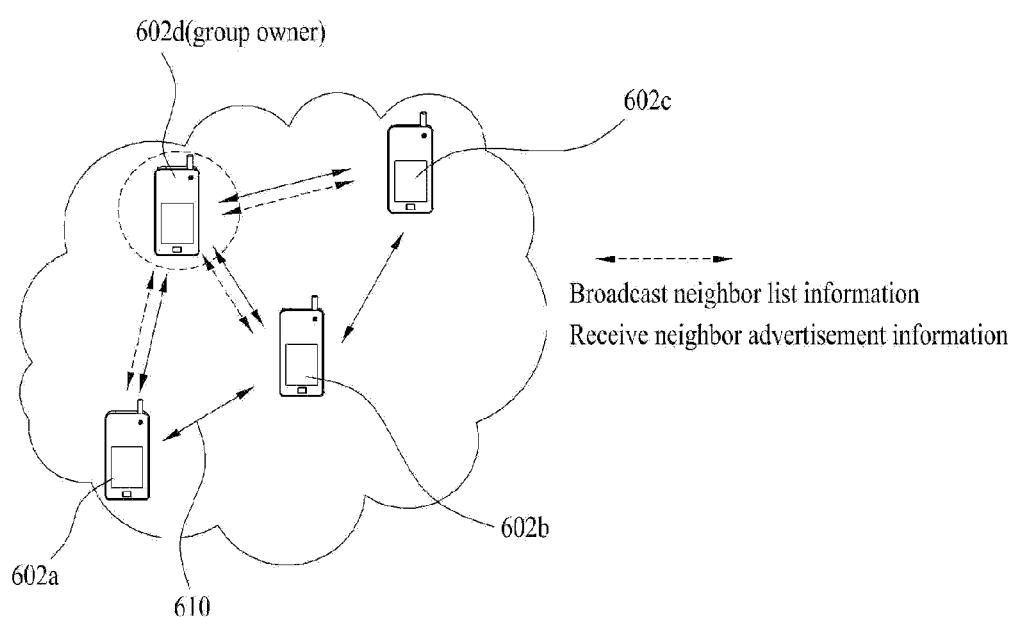
FIGS. 6 and 7 show exemplary neighbor discovery processes according to the present invention.

FIG. 6 is a conceptual diagram illustrating the neighbor discovery process according to the present invention. The basic situation/assumption of FIG. 6 is identical to those of FIG. 5.

Unlike the concept of FIG. 6, the neighbor discovery process of FIG. 6 can provide a group owner (Go) 602d to the WFD network. In this case, the group owner may broadcast neighbor list information to the peripheral P2P device (within the operation frequency) as denoted by a dotted arrow, and may receive neighbor advertisement information from the P2P device that wants to participate in the P2P group. In this case, the neighbor list information may include, for example, P2P device ID information (e.g., device ID, device nickname, etc.), mobility associated information (e.g., moving speed), power information, P2P service associated information (e.g., a service category, a social group, etc.), and information regarding pre-association with the corresponding P2P device. The neighbor list information may be broadcast by a request of the P2P device, or may be periodically broadcast by the request of the P2P device. The neighbor list information may be transmitted through a beacon. The group owner 602d may be pre-configured (e.g., AP), any one of the P2P devices (e.g., 602a to 602d) may be selected as a group owner by a network in response to a situation, or any one of the P2P devices (e.g., 602a to 602d) may autonomously serve as a group owner according to a situation. In addition, the number of P2P devices capable of being managed by the group owner 602d may be limited by WFD capability/coverage/available power. For this purpose, the neighbor list information may further include available group information (e.g., 1 bit information). For example, assuming that the number of P2P devices capable of being managed by the group owner 602d is set to N and N P2P devices participate in the group, the group owner 602d may assign a specific value (e.g., 1) indicating non-permission of group participation to the available group information.

The neighbor advertisement information may be used for the P2P devices (602a to 602c) to inform the group owner 602d of an intention of participating in the group. In addition, the neighbor advertisement information may include information needed for the group owner 602d to generate/manage the neighbor list, for example, P2P device ID information (e.g., device ID, device nickname, etc.), mobility associated information (e.g., moving speed), power information, P2P service associated information (e.g., a service category, a social group, etc.). Transmission of neighbor advertisement information may be initiated by reception of the neighbor list information, or may be initiated when P2P group participation is needed irrespective of reception of the neighbor list information.

The neighbor list information may be periodically transmitted. However, the neighbor list may be periodically transmitted only when the P2P devices (602a to 602c) recognize the presence of the group owner 602d or only when the P2P devices (602a to 602c) recognize that they do not escape from the WFD network. For example, if the P2P devices (602a to 602c) do not receive the neighbor list information for a predetermined time or more, the P2P devices (602a to 602c) may stop transmission of the neighbor advertisement information. In this case, each of the P2P devices (602a to 602c) may await until receiving new neighbor list information, or may serve as a group owner (e.g., neighbor list information generation/management/broadcasting).

The period/frequency for transmission of the neighbor advertisement information may be independently configured per P2P device. For example, the transmission period/frequency of the neighbor advertisement information may be decided in consideration of at least one of (1) mobility of the P2P device (e.g., moving speed), (2) power level of the P2P device, (3) intent (or a service interest level) for service provision, and (4) the number of services to be received by the first P2P device. In more detail, the higher the mobility (e.g., moving speed) of the P2P device, the longer/lower the transmission period/frequency of the neighbor advertisement information. In contrast, the lower the P2P device mobility, the shorter/higher the transmission period/frequency of the neighbor advertisement information. In addition, the higher a power level of the P2P device, the shorter/higher the period/frequency of the neighbor advertisement information. In contrast, the lower the power level of the P2P device, the longer/lower the transmission period/frequency of the neighbor advertisement information. In addition, the higher the service interest of the P2P device, the shorter/higher the transmission period/frequency of neighbor advertisement information. In contrast, the lower the service interest of the P2P device, the shorter/lower the transmission period/frequency of the neighbor advertisement information.

The P2P devices (602a to 602d) can recognize information regarding the presence/ID information/pre-association of the device capable of performing P2P communication on the basis of the neighbor list information, such that the P2P devices (602a to 602d) can obtain information regarding all the associated P2P devices if only the P2P group owner is found, without performing the neighbor discovery process for all the P2P devices. After acquiring the neighbor list information, the P2P device (e.g., 602a) may perform P2P communication 610 with the corresponding P2P device according to a desired service category or the like.

In the meantime, if the group owner 602d does not receive neighbor advertisement information for a predetermined time (e.g., T time) from the P2P device in the neighbor list, the corresponding P2P device may be removed from the neighbor list. Thereafter, the group owner 602d may periodically broadcast the updated neighbor list. The above T time may be independently given to each P2P device. In a similar way to the period/frequency of the neighbor advertisement message, the T time may be decided in consideration of at least one of (1) mobility of the P2P device (e.g., moving speed), (2) power level of the P2P device, (3) intent (or a service interest level) for service provision, and (4) the number of services to be received by the first P2P device.

The T time may be set to a specific time corresponding to an M times the neighbor advertisement period (where M is an integer higher than 1).

For reference, the P2P group and the P2P group owner have been defined in the legacy P2P mechanism. However, according to the legacy P2P mechanism, the P2P group enables the P2P group owner to serve as an AP, and enables the P2P client to serve as the STA. In this regard, the legacy P2P group is similar to a BSS of FIG. 1, but is irrelevant to that the P2P group owner manages/broadcasts the neighbor list and the P2P client transmits the neighbor advertisement information.

Figure 7:
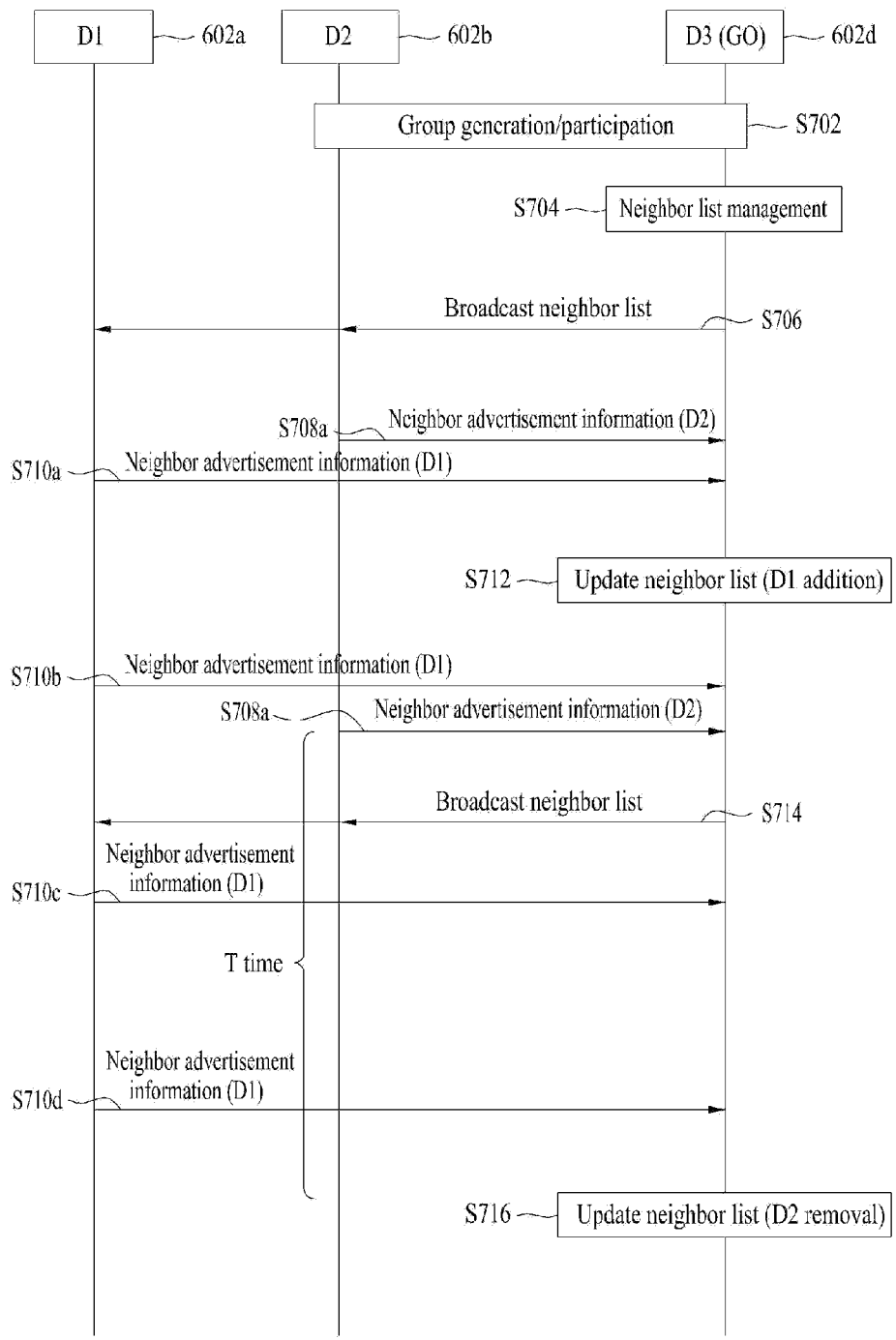

FIG. 7 is a flowchart illustrating an automatic neighbor discovery process according to the present invention. The basic situation/assumption is similar to those of FIG. 6. For convenience of description, although FIG. 7 shows an exemplary case in which three P2P devices participate in the P2P group, it should be noted that four or more P2P devices can also participate in the P2P group without departing from the scope or spirit of the present invention.

Referring to FIG. 7, a group is generated between D2 (e.g., 602b of FIG. 6) and D3 (e.g., 602d of FIG. 6), and D2 may participate in the group in step S702. In this case, it is assumed that the group owner (GO) is set to D3 and the group member is set to D2. Since D2 participates in the group, the group owner D3 manages/updates the neighbor list, and broadcasts the updated neighbor list according to the period in step S706. D1 (e.g., 602a of FIG. 6) receives the neighbor list, such that it recognizes the presence of a group owner and periodically transmits the neighbor advertisement information to the group owner in steps S710a to S710d. Similarly, D2 may periodically transmit its own neighbor advertisement information to the group owner in steps S708a to S708d. After the group owner receives neighbor advertisement information of D1/D2, it adds D1-associated information to the neighbor list in step S712 and broadcasts the updated neighbor list in accordance with a period in step S714. The period/frequency of neighbor advertisement information broadcast by D1 and D2 may be decided per P2P device in consideration of at least one of (1) mobility of the P2P device (e.g., moving speed), (2) power level of the P2P device, (3) intent (or a service interest level) for service provision, and (4) the number of services to be received by the first P2P device.

Meanwhile, this example assumes that D2 leaves from a group coverage due to the movement of D2. Due to the movement of D2, D2 may not receive neighbor list information from the group owner for a predetermined time, and may recognize that D2 has left from the group. Accordingly, D2 may not provide the neighbor advertisement information to the group owner D3 anymore. In contrast, from the viewpoint of the group owner, since signal strength decreases due to D2's out of coverage or neighbor advertisement information is not transmitted from D2, no neighbor advertisement information may be received from the D2 for a predetermined time (e.g., T time). In this case, the group owner can determine that D2 has left from the group and can remove D2 associated information from the neighbor list in step S716.

Figure 8:
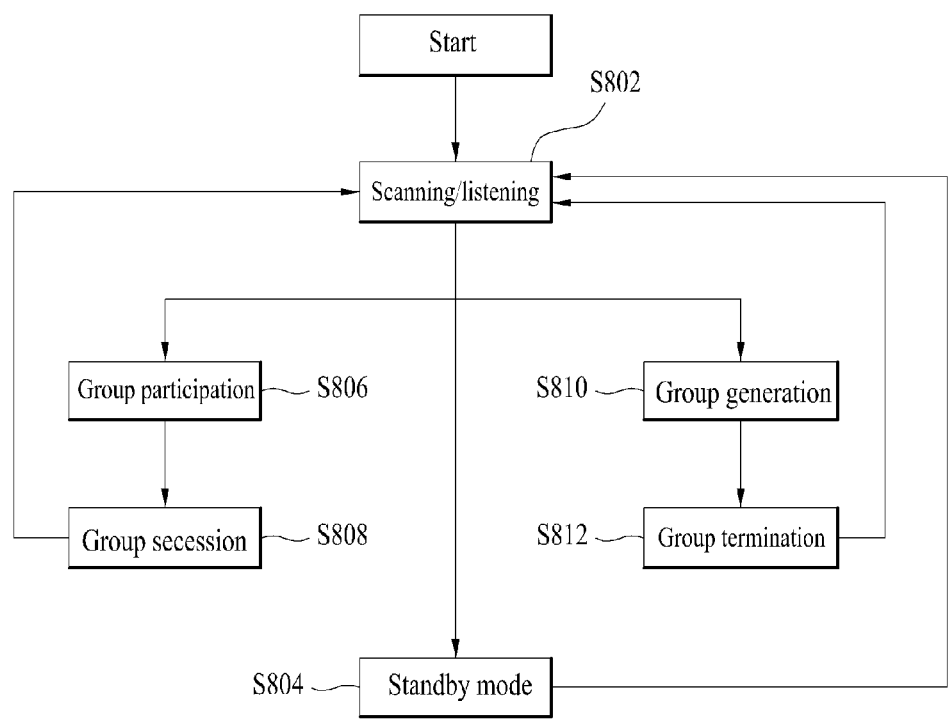
FIG. 8 is a flowchart illustrating a status diagram of the neighbor discovery process according to the present invention.

FIG. 8 is a flowchart illustrating a status diagram of the neighbor discovery process according to the present invention. The basic operations of FIG. 8 are identical or similar to those of FIGS. 6 and 7. Referring to FIG. 8, the P2P device (e.g., 602a of FIG. 6) performs the scanning/listening operations of the available RF channel in step S801. If the group owner is found in the corresponding RF channel and the group owner has the capability of accommodating additional member(s), the P2P device may participate in the corresponding group in step S806 or secede from the corresponding group in step S808. As a condition for group participation, it can be considered whether the corresponding group owner is managing the neighbor P2P interested by the P2P device. During secession from the group, the P2P device may perform again the scanning/listening process in step S802, or may defer the scanning/listening process as necessary.

In the meantime, if the P2P device does not participate in the group at a corresponding RF channel, the P2P device may self-generate a group, and may operate as a group owner in step S810. Cases that the P2P device cannot participate in the group includes: the legacy group/group owner may not exist, or the group exists but the group owner cannot accommodate the additional member. In addition, the exemplary case in which the P2P device operates as the group owner may be limited to a case in which the corresponding P2P device is pre-configured to serve as the group owner or a case in which the corresponding P2P device has enough power and stability to generate/maintain a necessary group. If P2P communication is completed, the P2P device terminates the group in step S812.

On the other hand, if group participation is impossible or group generation is also impossible, the P2P device enters the standby mode (e.g., sleep mode) in step S804.

In the shown status diagram, status modification associated with a group (e.g., group secession, group termination, etc.) may occur by movement, power limitation, etc. of the P2P device/group owner.

For convenience of description, although the above described embodiment has been disclosed on the basis of the automatic neighbor discovery process (See FIGS. 6 to 8), the automatic neighbor discovery process according to the present invention may also be used along with the legacy on-demand neighbor discovery process (See FIG. 4). For example, the automatic neighbor discovery process has priority so that the automatic neighbor discovery process is first carried out. If there is no P2P group capable of participating in the group, the legacy on-demand neighbor discovery process can be performed. In addition, the automatic neighbor discovery process of the present invention and the legacy on-demand neighbor discovery process can be selectively used according to configuration information.

Figure 9:
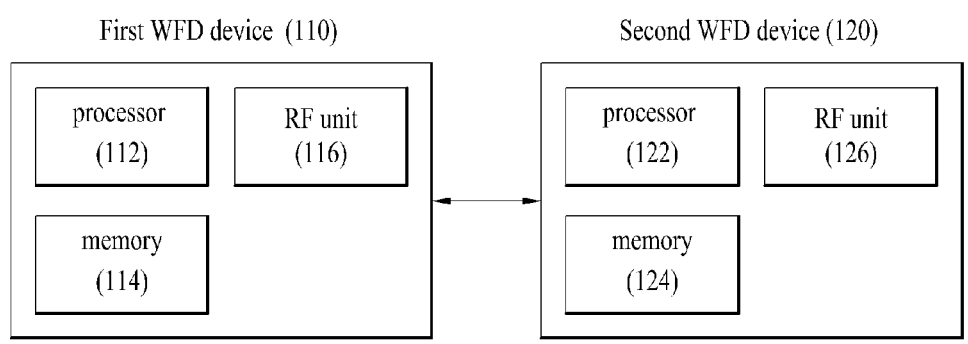
FIG. 9 is a block diagram illustrating a WFD P2P device applicable to the present invention.

FIG. 9 is a block diagram illustrating a WFD P2P device applicable to the present invention.

Referring to FIG. 9, the WFD network includes a first WFD device 110 and a second WFD device 120. The first WFD device 110 includes a processor 112, a memory 114, and a radio frequency (RF) unit 116. The second WFD device 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The second WFD device 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The first WFD device 110 and/or the second WFD device 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to claims other than the specific claims to constitute the embodiment or add new claims by means of amendment after the application is filed.

The above-described embodiments may be implemented by various means, for example, by hardware, firmware, software, or a combination thereof. In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Exemplary embodiments of the present invention can be applied to a P2P communication device. In more detail, the embodiments of the present invention can be applied to a WFD P2P communication device.

The invention claimed is:

1. A method for performing a neighbor discovery procedure for wireless fidelity direct (WFD) peer to peer (P2P) communication, the method comprising:
   determining, by a first WFD P2P device, if a participatable WFD P2P group exists or not; and
   performing, by the first WFD P2P device, an operation for participating in the participatable WFD P2P group based on neighbor information when the participatable WFD P2P group exists, wherein the operation for participating in the participatable WFD P2P group based on the neighbor information includes:
receiving neighbor list information from a specific WFD P2P device managing the participatable WFD P2P group;
periodically transmitting neighbor advertisement information about the first WFD P2P device to the specific WFD P2P device after reception of the neighbor list information;
participating in the participatable WFD P2P group managed by the specific WFD P2P device based on the neighbor information when the specific WFD P2P device receives the neighbor advertisement information about the first WFD P2P device,
wherein the neighbor advertisement information is subsequently transmitted, by the first WFD P2P device, to the specific WFD P2P device after the first WFD P2P device participates in the participatable WFD P2P group,
wherein the first WFD P2P device is removed from the participatable WFD P2P group managed by the specific WFD P2P device when the specific WFD P2P device does not receive the neighbor advertisement information about the first WFD P2P device in a predetermined time,
wherein the predetermined time is determined for each WFD P2P device in the WFD P2P group managed by the specific WFD P2P device based on a mobility of a corresponding WFD P2P device, a power level of the corresponding WFD P2P device and a number of services to be received by the corresponding WFD P2P device,
wherein the first WFD P2P device obtains information regarding all WFD P2P devices in the participatable WFD P2P group managed by the specific WFD P2P device from the specific WFD P2P device; and
performing P2P communication related to a specific service with a second WFD P2P device based on the obtained information,
wherein the second WFD P2P device is a member of the participatable WFD P2P group.

2. The method according to claim 1, wherein the neighbor list information includes at least one of WFD P2P device ID information, mobility associated information, power information, WFD P2P device associated information, and information for pre-association with a WFD P2P device.

3. The method according to claim 1, wherein the generation of the new WFD P2P group includes:
broadcasting neighbor list information having information regarding the first WFD P2P device;
receiving neighbor advertisement information about the corresponding WFD P2P device from third WFD P2P device(s) after broadcasting the neighbor list information; and
updating the neighbor list information using the neighbor advertisement information.

4. The method according to claim 3, wherein:
if neighbor advertisement information is not received from at least one WFD P2P device of the third WFD P2P device(s) for a predetermined time or more, information about the at least one WFD P2P device is removed from the neighbor list information.

5. A first wireless fidelity direct peer to peer (WFD P2P) device configured to perform a neighbor discovery procedure for WFD P2P communication, the first WFD P2P device comprising:
a radio frequency (RF) unit; and
a processor operatively connected to the RF unit and configured to:
determine if a participatable WFD P2P group exists or not, and
perform an operation for participating in the participatable WFD P2P group based on neighbor information when the participatable WFD P2P group exists,
wherein the operation for participating in the participatable WFD P2P group based on the neighbor information includes:
receiving neighbor list information from a specific WFD P2P device managing the participatable WFD P2P group;
periodically transmitting neighbor advertisement information about the first WFD P2P device to the specific WFD P2P device after reception of the neighbor list information; and
participating in the participatable WFD P2P group managed by the specific WFD P2P device based on the neighbor information when the specific WFD P2P device receives the neighbor advertisement information about the first WFD P2P device,
wherein the neighbor advertisement information is subsequently transmitted, by the first WFD P2P device, to the specific WFD P2P device after the first WFD P2P device participates in the participatable WFD P2P group,
wherein the first WFD P2P device is removed from the participatable WFD P2P group managed by the specific WFD P2P device when the specific WFD P2P device does not receive the neighbor advertisement information about the first WFD P2P device in a predetermined time,
wherein the predetermined time is determined for each WFD P2P device in the WFD P2P group managed by the specific WFD P2P device based on a mobility of a corresponding WFD P2P device, a power level of the corresponding WFD P2P device and a number of services to be received by the corresponding WFD P2P device,
wherein the first WFD P2P device obtains information regarding all WFD P2P devices in the participatable WFD P2P group managed by the specific WFD P2P device from the specific WFD P2P device, and
performing P2P communication related to a specific service with a second WFD P2P device based on the obtained information,
wherein the second WFD P2P device is a member of the participatable WFD P2P group.

6. The first WFD P2P device according to claim 5, wherein the neighbor list information includes at least one of WFD P2P device ID information, mobility associated information, power information, WFD P2P device associated information, and information for pre-association with a WFD P2P device.

7. The first WFD P2P device according to claim 5, wherein the operation for generating the new WFD P2P group includes:
broadcasting neighbor list information having information regarding the first WFD P2P device;
receiving neighbor advertisement information about the corresponding WFD P2P device from third WFD P2P device(s) after broadcasting the neighbor list information; and
updating the neighbor list information using the neighbor advertisement information.

8. The first WFD P2P device according to claim 7, wherein:
  if neighbor advertisement information is not received from at least one WFD P2P device of the third WFD P2P device(s) for a predetermined time or more, information about the at least one WFD P2P device is removed from the neighbor list information.

\* \* \* \* \*